(No Model.)
R. W. GORDON.
MANDREL FOR WELDING PIPE COUPLING SLEEVES.
No. 386,122. Patented July 17, 1888.
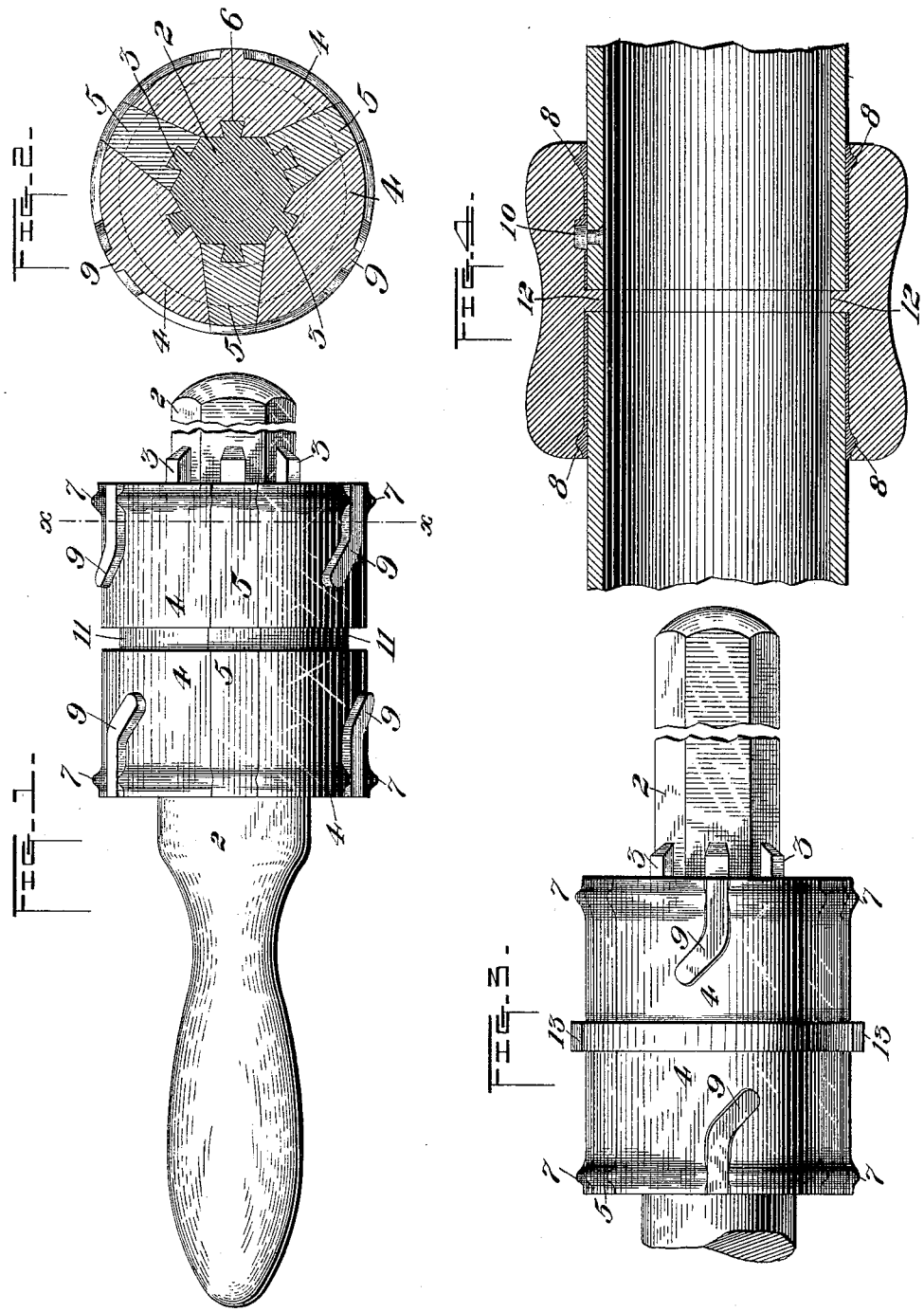
WITNESSES.
INVENTOR.
Robert W. Gordon.
by W. Bakewell & Sons,
his attorneys.

UNITED STATES PATENT OFFICE.

ROBERT W. GORDON, OF McKEESPORT, PENNSYLVANIA.

MANDREL FOR WELDING PIPE-COUPLING SLEEVES.

SPECIFICATION forming part of Letters Patent No. 386,122, dated July 17, 1888.

Application filed April 5, 1888. Serial No. 269,712. (No model.)

*To all whom it may concern:*

Be it known that I, ROBERT W. GORDON, of McKeesport, in the county of Allegheny and State of Pennsyvania, have invented a new and useful Improvement in Mandrels for Welding Pipe-Coupling Sleeves; and I do hereby declare the following to be a full, clear, and exact description thereof, reference being had to the accompanying drawings, forming part of this specification, in which—

Figure 1 is a side view of my improved socket-mandrel. Fig. 2 is a sectional view on the line $x\ x$ of Fig. 1. Fig. 3 is a view of a modification. Fig. 4 is a sectional view showing the socket or coupling-sleeve formed by the mandrel and the ends of pipe-sections fitting in the sleeve.

Like symbols of reference indicate like parts in each.

In the drawings, 2 represents a central core hexagonal in cross-section, and provided with dovetailed ribs 3 on each of the hexagonal faces. Surrounding the core is the mandrel proper, which is cylindrical in shape and is formed in sections 4 5, the sections 4 being smaller at their bases or next the core than at the circumference, while the sections 5 are larger at the base, the bases of all the sections being the same size as the hexagonal faces of the central core. These sections at their base are provided with dovetailed recesses 6, which engage with the dovetailed ribs on the core 2, so that when the sections 4 5 are fitted on the core and engaging with the ribs they are prevented from separating from the core and each other laterally, while at the same time the core may be withdrawn longitudinally from the sections, which then having no support will readily separate from each other. This mandrel, as I have described it, can be used for the purpose of welding sleeves or collars; but I have designed my improved mandrel especially with the purpose of forming or welding coupling-sleeves for joining the sections of tubing where these sleeves have interior recesses or have a greater interior diameter at the middle portion than at the ends, which condition ordinarily prevents the use of a common mandrel, or a mandrel having a greater middle portion, as after the sleeve has been formed it would be impossible to withdraw the mandrel therefrom.

In the drawings I have shown two modifications of my device, as well as the finished sleeve or coupling-socket fitted on the ends of pipe-sections.

In Fig. 1 the circumference or outer surface of the mandrel is provided with an annular projection, 7, at each end, which is adapted to form the depressions 8 in the interior of the sleeve. It is also provided with angular projections 9, adapted to form the recesses 10 in the interior of the sleeve. In Fig. 1 an annular groove 11 is formed in the outer circumference of the mandrel for the purpose of forming the annular projection 12 in the interior of the sleeve, as is shown in Fig. 4. In Fig. 3, however, the equivalent of this is shown by an annular ring, 13, formed on the outer face of the mandrel, which forms a recess, instead of a projection, in the sleeve. These recesses in the sleeve, which are shown in Fig. 4, and which I have described, are adapted and intended for the purpose of receiving packing of lead or other material when the sleeve is fitted on the sections of pipe.

The operation of my device is as follows: The metal from which the coupling-sleeve is to be formed having been heated is welded around the mandrel in the usual manner, during which operation the metal is caused to conform on its inner surface to the outer surface of the mandrel. Owing to the projections and form of the mandrel the sleeves become firmly engaged therewith after they have been formed, and in order to withdraw the mandrel it is necessary to separate the parts, which is done by pulling out the central core, 2, when the outer sections will collapse and are readily removed.

Although I have described the mandrel as having an annular recess, 11, or projection 13, this feature may be omitted where it is desired to form a socket without a central cavity or projection.

I am aware that separable mandrels have been employed in welding pipe and tubing, and I therefore do not desire to claim such mandrels broadly; but,

Having thus described my invention, what I claim, and desire to secure by Letters Patent, is—

1. In a mandrel for welding pipe-coupling sleeves, which sleeves have interior projections or recesses, the combination of a central core and outer sections, part of said sections having a smaller base than outer surface, and part having a larger base than outer surface, the sections being united with the core by engaging grooves and projections, substantially as and for the purposes described.

2. In a mandrel for welding pipe-coupling sleeves, the combination of a central core, outer sections, and recesses and projections for uniting the sections with the central core, and projections or grooves formed on the outer faces of the sections, substantially as and for the purposes described.

In testimony whereof I have hereunto set my hand, this 3d day of April, A. D. 1888.

ROBERT W. GORDON.

Witnesses:
W. B. CORWIN,
JAMES K. BAKEWELL.